(12) United States Patent
Wakui et al.

(10) Patent No.: US 6,544,060 B2
(45) Date of Patent: Apr. 8, 2003

(54) SHUNT OF SQUIB

(75) Inventors: Masanori Wakui, Toyota (JP); Atsushi Nishida, Toyota (JP); Akira Nagamine, Kariya (JP); Takashi Iida, Anjo (JP)

(73) Assignees: Toyota Jidosha Kabushiki Kaisha, Toyota (JP); J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 09/943,909

(22) Filed: Aug. 31, 2001

(65) Prior Publication Data

US 2002/0025708 A1 Feb. 28, 2002

(30) Foreign Application Priority Data

Aug. 31, 2000 (JP) ........................................ 2000-264688
Oct. 25, 2000 (JP) ........................................ 2000-326026

(51) Int. Cl.⁷ .............................................. H01R 29/00
(52) U.S. Cl. ........................................ 439/188; 439/352
(58) Field of Search ................................ 439/188, 352, 439/507, 510, 680; 200/51.9, 51.1

(56) References Cited

U.S. PATENT DOCUMENTS 5,064,973 A * 11/1991 Zinn et al. ................. 200/51.1
5,275,575 A    1/1994 Cahaly et al.
5,827,083 A * 10/1998 Dullin ......................... 439/188

FOREIGN PATENT DOCUMENTS

JP       6-208867      7/1994
TW       129094        2/1990

OTHER PUBLICATIONS

U.S. patent application No. 09/797,259 entitled "Electrical Connection System"; filed on Mar. 1, 2001; pp. 1 to 24 and Figs. 1 to 15.

* cited by examiner

Primary Examiner—Khiem Nguyen
(74) Attorney, Agent, or Firm—W. F. Fasse; W. G. Fasse

(57) ABSTRACT

The present invention aims to prevent forcing of pins when a female connector is obliquely inserted into a shunt.

A shunt fits into a cylindrical socket concavely formed in an external face of a housing of an airbag inflator and short-circuits of a pair of contact pins of a squib of the inflator. These pins rise at the center of the socket from the bottom to a point near to the opening. The shunt includes an annular wall having a fitting hole into which the pins enter from the bottom side of the center thereof and into which a female connector fits from the top side, and a short-circuit piece provided on the annular wall, which will contact both of the pins when the shunt is fitted into the socket, and will be pushed to move away from the pins when the female connector is fitted into the fitting hole. To prevent forcing or bending of the pins if the female connector is improperly obliquely inserted into the fitting hole of the shunt, the height of the annular wall is not less than the sum of the depth of insertion of the female connector into the fitting hole in the axial direction of the pins when the female connector is inserted obliquely plus the height of the pins from the bottom of the socket.

14 Claims, 10 Drawing Sheets

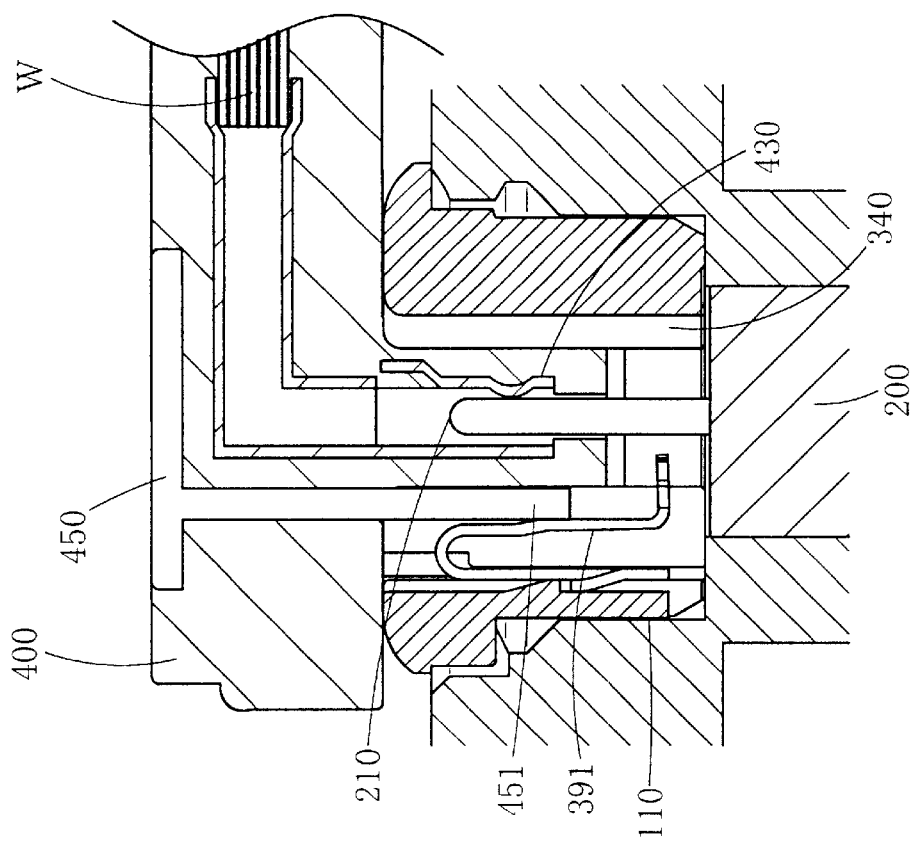
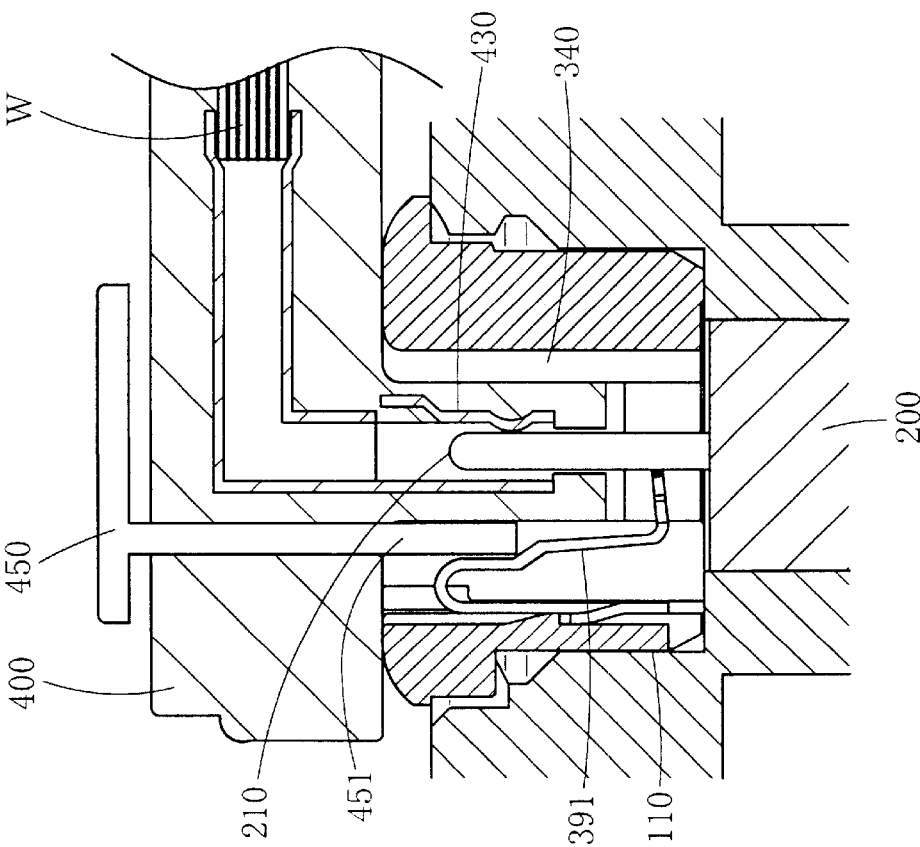

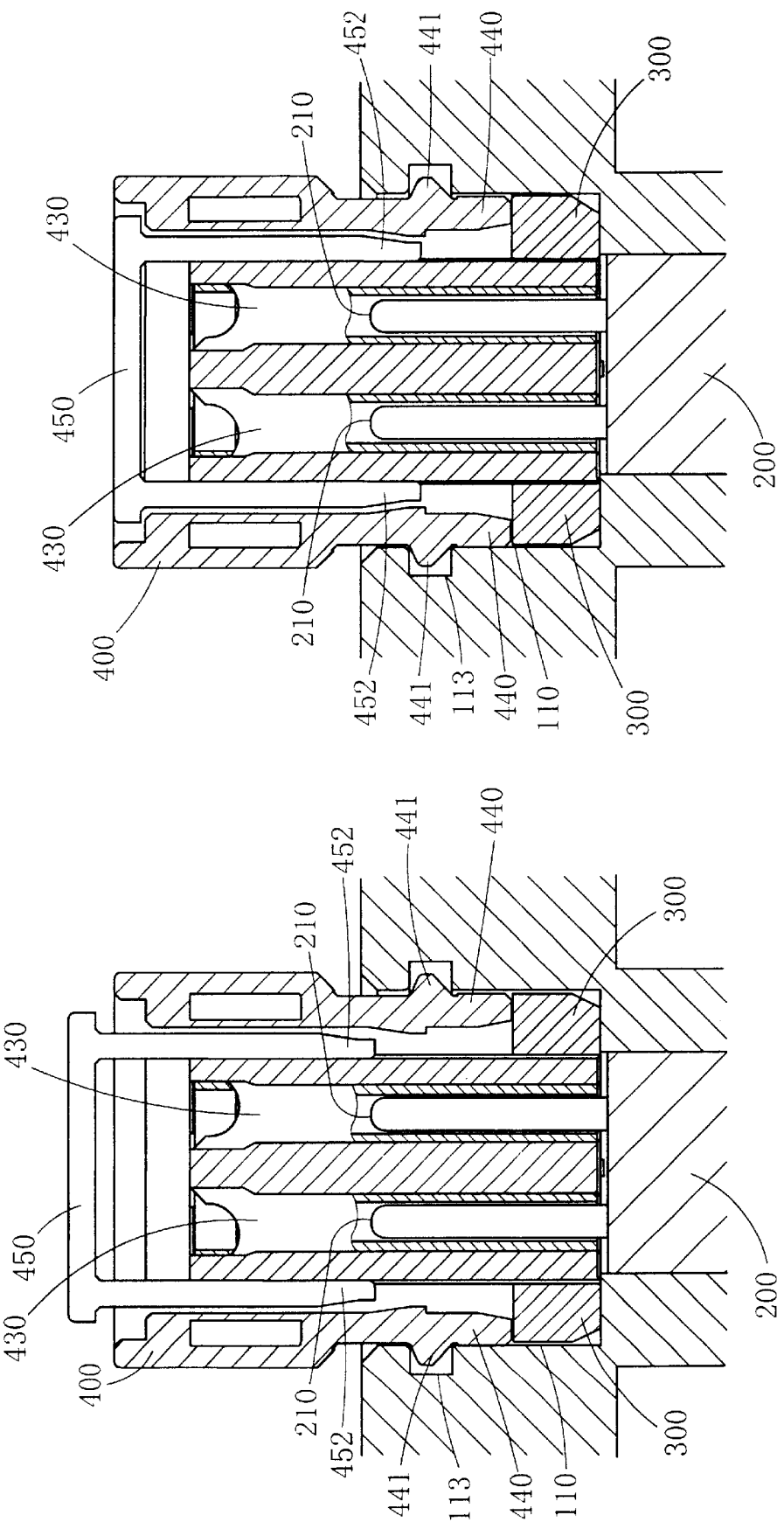

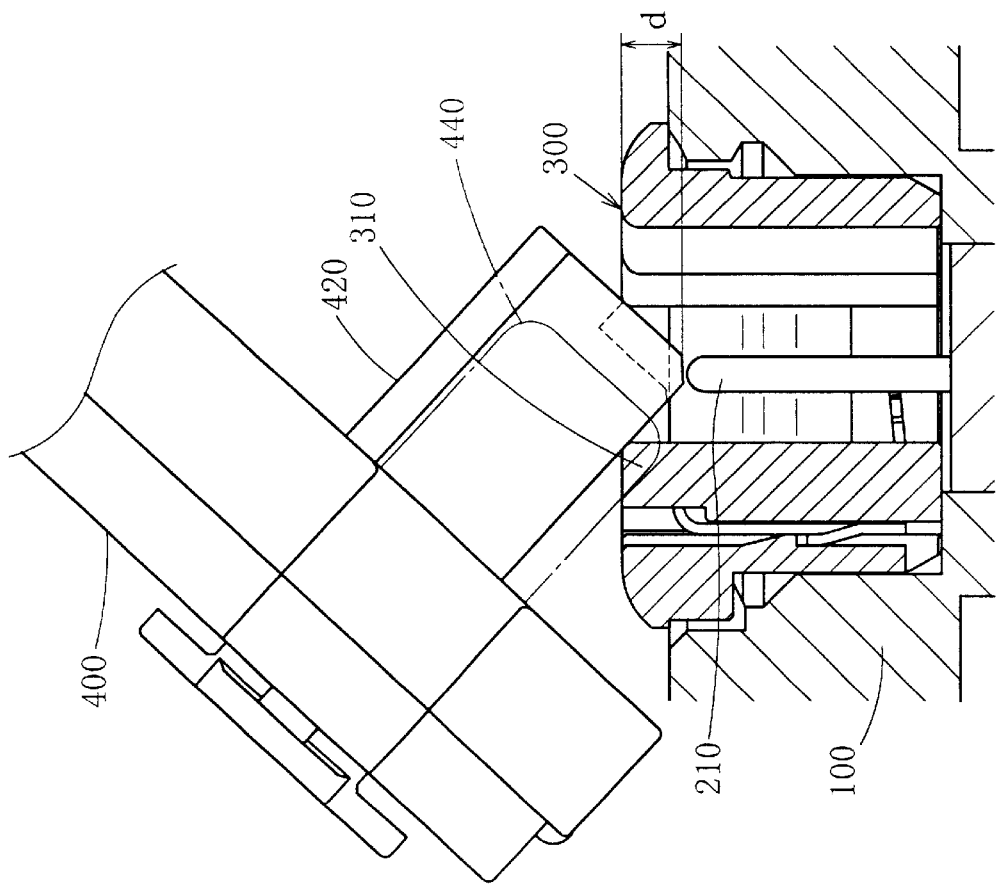
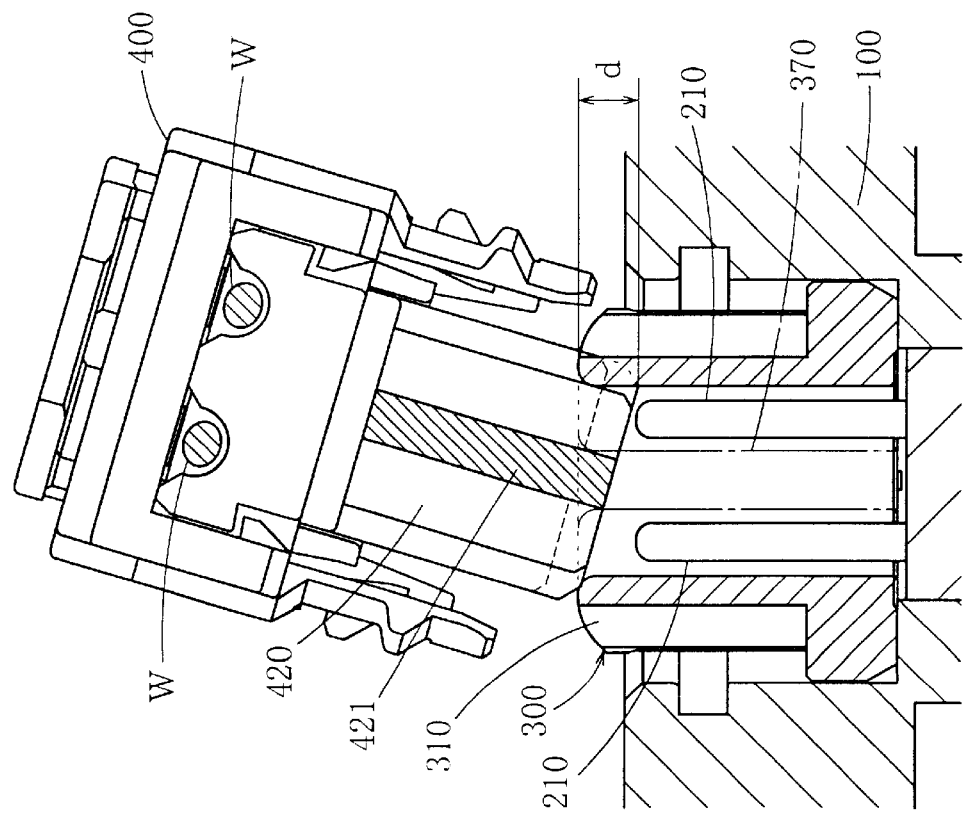

SHUNT OF SQUIB

BACKGROUND OF THE INVENTION

1. Field of the Invention

An inflator, which feeds gas into an airbag to inflate it, has a squib. To supply electric energy to this squib, a female connector is connected to a pair of pins of the squib. The present invention relates to a shunt, which short-circuits the pair of pins of the squib until the female connector is connected to the pair of pins.

2. Related Art

A shunt is known, which is fitted into a cylindrical socket being concavely formed in an external face of a housing of an inflator and short-circuits a pair of pins of a squib, said pair of pins rising at the center of the socket from the bottom up to the opening. For example, Japanese Patent unexamined publication gazette Heisei 6-208867 discloses a shunt that is called a short-circuit insert. This shunt has a short-circuit clip and uses this short-circuit clip to short-circuit a pair of pins of a squib so as to prevent the squib from false actuation. After an inflator is fitted into a vehicle, when a female connector is fitted into the socket, the female connector will be connected to the pair of pins and at the same time the short-circuit clip will be pushed by a leg of the female connector to move away from the pair of pins. As a result, the actuation circuit for the squib will get active so that it can actuate the inflator.

When the female connector is to be connected to the pair of pins, the female connector must be inserted in such a way that the direction of holes of the female terminals aligns with the axial direction of the pair of pins. However, as this operation is done manually, the female connector may be inserted in such a way that the direction of holes of the female terminals is oblique to the axial direction of the pair of pins. Such insertion is called oblique insertion. If this occurs, the female connector will force the pins to deform. If such deformation occurs, it will be necessary to make the deformed pins straight or replace the entire inflator with a new one. In either case, it will result in a higher cost.

SUMMARY OF THE INVENTION

The present invention was made in view of the above-mentioned points, and one object of the present invention is to prevent forced deformation of pins due to oblique insertion of the female connector and, in turn, reduce costs by providing a shunt with a fitting hole into which the female connector fits and keeping high the elevation of the annular wall of this fitting hole.

To accomplish the above-mentioned objective, the present invention is a shunt, which fits into a cylindrical socket being concavely formed in an external face of a housing of an inflator and short-circuits a pair of pins of a squib, said pair of pins rising at the center of the socket from the bottom to a point near to the opening, said shunt comprises an annular wall having a fitting hole into which pins enter from the bottom side at the center thereof and into which the female connector fits from the top side, and a short-circuit piece, which is provided on said annular wall, will contact both the pair of pins when the shunt is fitted into the socket, and will be pushed to move away from the pins when the female connector is fitted into the fitting hole, the height of said annular wall being not less than the sum of the depth of insertion of the female connector into the fitting hole in the axial direction of the pins when the female connector is inserted obliquely and the height of the pins from the bottom of the socket.

When this shunt is fitted into the socket, the pins of the squib will enter the fitting hole from the bottom side thereof. As the short-circuit piece contacts both the pair of pins to short-circuit them, the squib will not function. When the female connector is fitted into the fitting hole, the short-circuit piece will be pushed by the female connector to move away from the pins, and at the same time the female connector will contact both the pair of pins to make active the actuation circuit of the squib, enabling the actuation of the inflator.

In this case, if the female connector is inserted obliquely, the female connector will strike on the annular wall and halt. As the depth of insertion of the female connector into the fitting hole in the axial direction of the pins is not more than the length from the top end of the pins to the top of the annular wall, the female connector will not press on the pins. Hence the female connector will not force the pins. Accordingly, the pins will not be deformed, and when the female connector is reinserted properly this time, the female connector will be connected to the pins reliably In this way, the problem can be eliminated and the cost can be lowered.

Similar actions may be obtained by making the housing of the inflator thicker or reducing the height of the pins from the bottom of the socket. However, as the configurations of the inflators and squibs tend to be unified to recommended configurations, the above-mentioned changes will merely invite confusion by increasing the kinds of inflators and squibs. In contrast to them, if the shunt of the present invention is used, the female connector can be prevented from forcing the pins without altering the configurations of the inflator and the squib. Thus the shunt of the present invention is useful.

BRIEF DESCRIPTION OF THE DRAWINGS

FIG. 2A is a plan view, FIG. 2B is a front view and FIG. 2C is a bottom view, respectively.

FIG. 5A and FIG. 5B are longitudinal sectional views of the shunt of the first embodiment into which the female connector is fitted. FIG. 5A is a sectional view showing the state when a slider is pulled up from the connector body. FIG. 5B is a sectional view showing the state when the slider is pushed into the connector body.

FIG. 6A and FIG. 6B are longitudinal sectional views showing the female connector being fitted into the shunt of the first embodiment. These figures are seen from an aspect differing from that of FIG. 5A and FIG. 5B. FIG. 6A is a sectional view showing the state when the slider is pulled up from the connector body. FIG. 6B is a sectional view showing the state when the slider is pushed into the connector body.

FIG. 7A and FIG. 7B show oblique insertion of the female connector. FIG. 7A is a sectional view that is obtained by cutting the shunt along the 7A—7A line shown in FIG. 2A and by cutting the housing and the female connector by the same line. FIG. 7B is a sectional view obtained by cutting them along the: center line, and a locking piece is indicated by an imaginary line.

FIG. 10A is a plan view, FIG. 10B is a front view, and FIG. 10C is a bottom view, respectively.

PREFERRED EMBODIMENTS OF THE INVENTION

Figure 1:
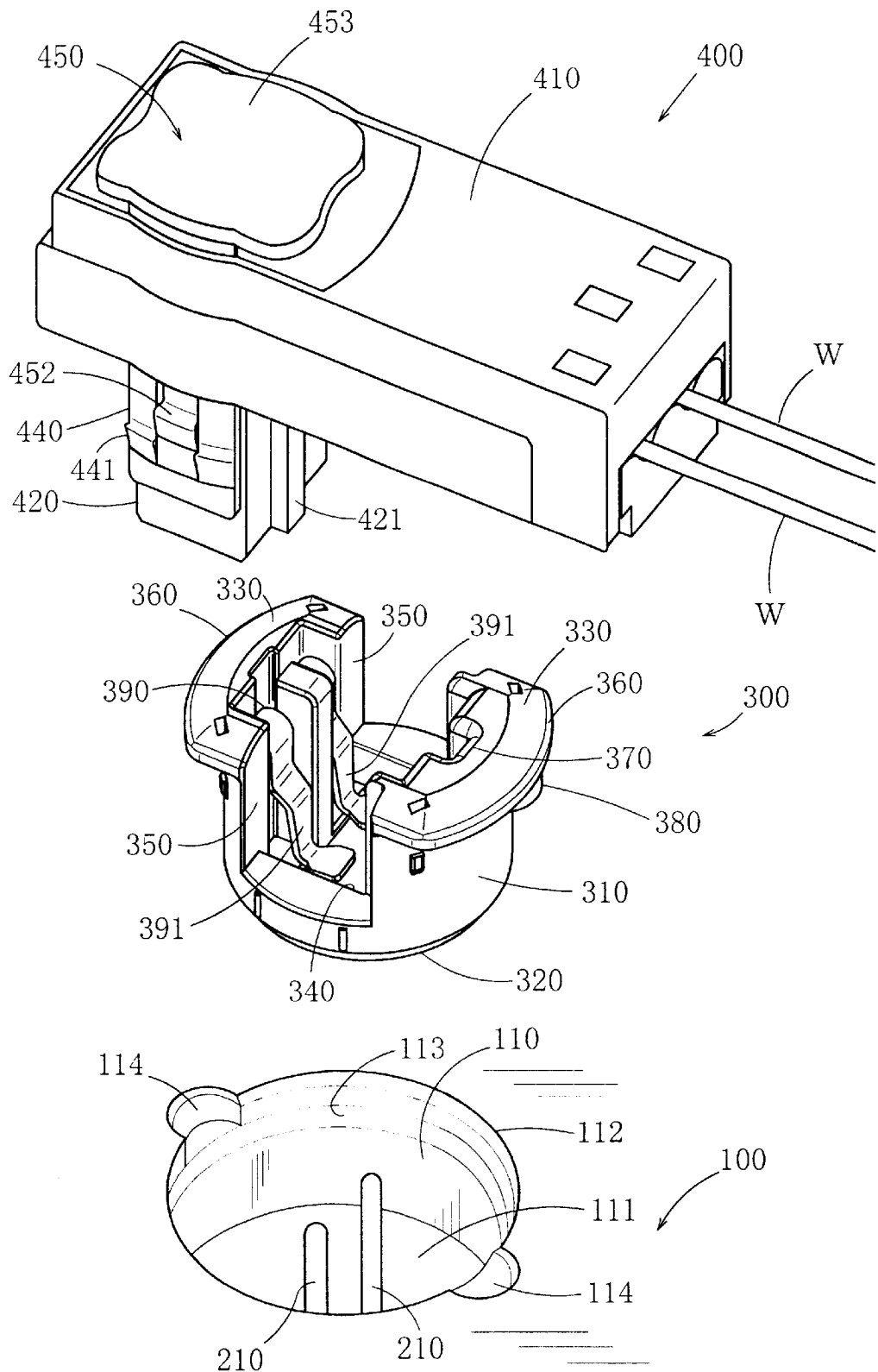
FIG. 1 is a perspective view separately showing an inflator housing, a shunt and a female connector according to the first embodiment of the present invention.

In the following, embodiments of the shunt of the squib according to the present invention will be described. FIG. 1 shows the shunt of the first embodiment and members around the shunt. 100 denotes a housing of an inflator. Inside the housing 100 of the inflator, is fixed a squib 200 that receives electric energy to generate heat, and an initiator and a gas generator are arranged around the squib 200. On the back side of the inflator, a folded airbag is stored. When the squib 200 receives electric energy to generate heat, the initiator will be ignited, and, this in turn will make the gas generator generate gas, and this gas will inflate the airbag.

A cylindrical socket 110 is concavely formed in the external face of the housing 100 of the inflator. The squib 200 is fixed on the back side of this socket 110. A pair of pins 210, which are connected to a stored heater, protrude from the squib 200, said pair of pins 210 rising at the center of the socket 110 from the bottom 111 to a point near to the opening 112. In this embodiment, the depth of the socket 110 or dimension from the bottom 111 to the opening 112 is 7.5 mm (the tolerance is from +0.3 mm to −0.1 mm), and the height of the pins 210 from the bottom 111 of the socket 110 is 7.0 mm (the tolerance is from +0.2 mm to −0.5 mm). At the time of filing of the present application for patent, such configurations are recommended configurations of the housing 100 and the squib 200. However, such dimensions are merely preferable[e]xamples and do not limit in any way the dimensions of the present invention. In short, the depth of the socket 110 is set in such a way that it is nearly equal to the height of the pins 210 from the bottom 111 of the socket 110 and the pins 210 do not come out of the opening 112 of the socket 110 even if the dimensions of the product vary within the tolerances.

Figure 2A:
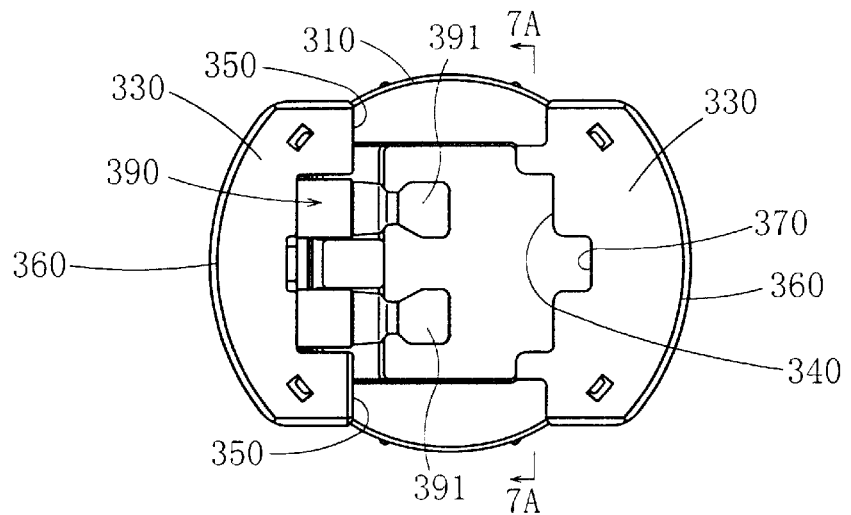
FIG. 2A, FIG. 2B and FIG. 2C show the shunt of the first embodiment.
Figure 2B:
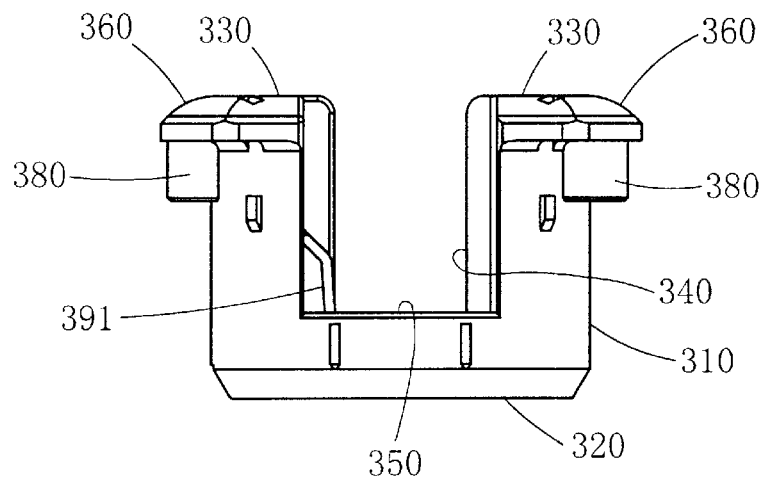
Figure 2C:
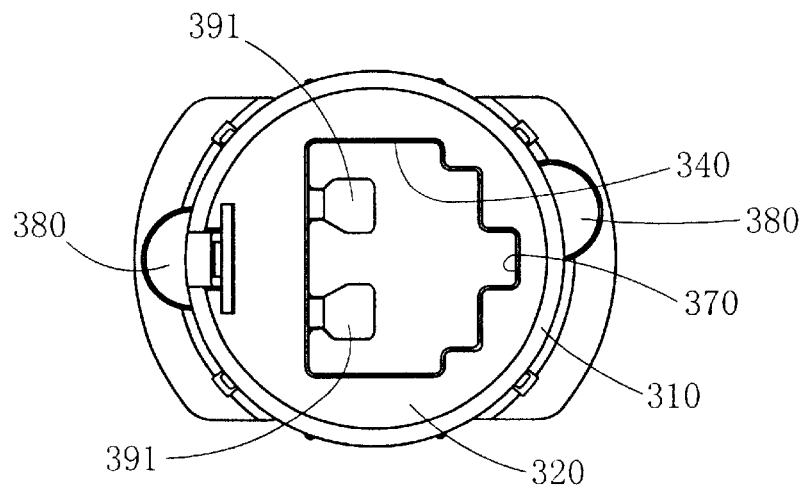

A shunt 300, which short-circuits the pair of pins 210, is fitted into the socket 110. As shown in FIG. 2A, FIG. 2B and FIG. 2C, the shunt 300 comprises an annular wall 310 and a short-circuit piece 390 provided on the shunt 300. The annular wall 310 is made of an insulator, is approximately formed into a cylinder, and is formed so that it can fit into the socket 110. A fitting hole 340 penetrating from the bottom 320 to the top 330 is formed at the center of the annular wall 310. The pins 210 come into this fitting hole 340 from the bottom side. The top side of the fitting hole 340 is configurated to accept a boss 420 so that a female connector 400 can fit into the fitting hole 340. A short-circuit piece 390 contacts both the pair of pins 210 when the shunt 300 is fitted into the socket 110. When the female connector 400 is inserted into the fitting hole 340, the short-circuit piece 390 will be pushed by the female connector 400 to move away from the pins 210. The short-circuit piece 390 is made of a conductor, and one end thereof is fixed on the annular wall 310 at a point close to the top 330. Two contact pieces 391 being bent into an approximately L-shape branch out from another end of the short-circuit piece 390. These contact pieces 391 extend along the annular wall 310 towards the bottom 320. When the contact pieces 391 are flexed, the top ends of the contact pieces 391 will be displaced sidewise. When the shunt 300 is fitted into the socket 110, the top end of each contact piece 391 will contact al corresponding pin 210 to short-circuit both the pair of pins 210i by means of the short-circuit piece 390. Then, when the boss 420 of the female connector 400, which will be described later, is fitted into the fitting hole 340, the top ends of the contact pieces 391 with be pushed by the boss 420 of the female connector 400 to move away from the pins 210; thus the connection between both the pair of pins 210 will be undone.

Figure 4:
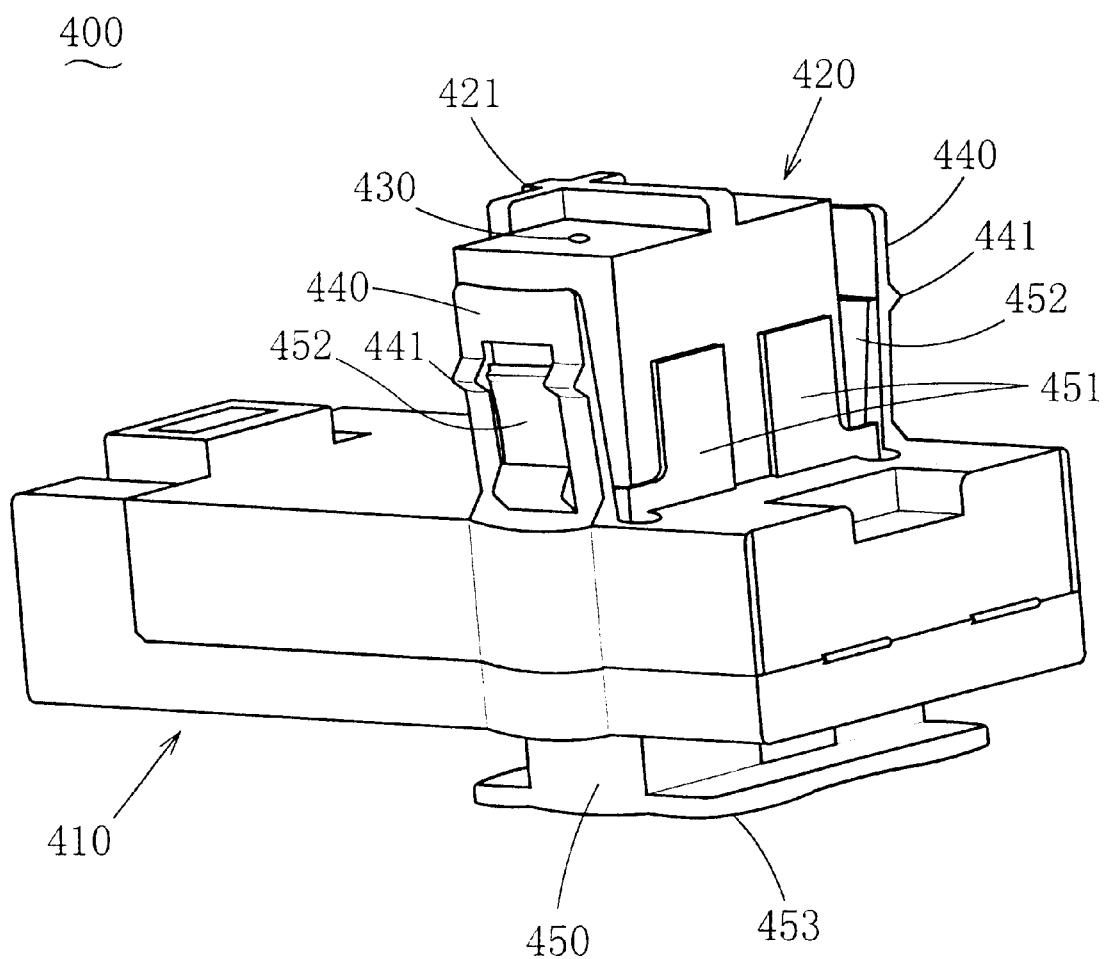
FIG. 4 is a perspective view of the female connector.

As shown in FIG. 1 and FIG. 4, the female connector 400 comprises a box-shaped connector body 410, a square-pillar-shaped boss 420 protruding from the bottom of the connector body 410, and female terminals 430 being provided inside the connector body 410 and the boss 420 and having connection ports at the top end of the boss 420. An electric wire W is connected to each female terminal 430. These electric wires W are connected to a control means that feeds electric energy to the squib 200. The female connector 400 further comprises locking pieces 440 that protrude from the connector body 410 on both sides of the boss 420. A pawl 441 protruding outward is provided on the top end of each locking piece 440. Grooves 113 for hooking the pawls 441 of the locking pieces 440 are formed in the inner wall of the socket 110. The female connector 400 further comprises a slider 450, which penetrates through the connector body 410 and slides along the boss 420. The slider 450 is provided with the first wedges 451, which move up and down along the front face of the boss 420, said front face opposing the contact pieces 391 when the boss 420 is fitted into the fitting hole 340, and with the second wedges 452, which move up and down between the boss 420 and the locking pieces 440 and are partly exposed through a windows in the locking pieces 440. The top of the slider 450, which extrudes on the top side of the connector body 410, is shaped flat to form a button 453.

Two U-shaped notches 350 are formed in the: annular wall 310 of the shunt 300, the U-shaped notches 350 opposing each other across the center of the annular wall 310. When the female connector 400 is fitted into the shunt 300, the locking pieces 440 will fit into the notches 350.

Figure 3:
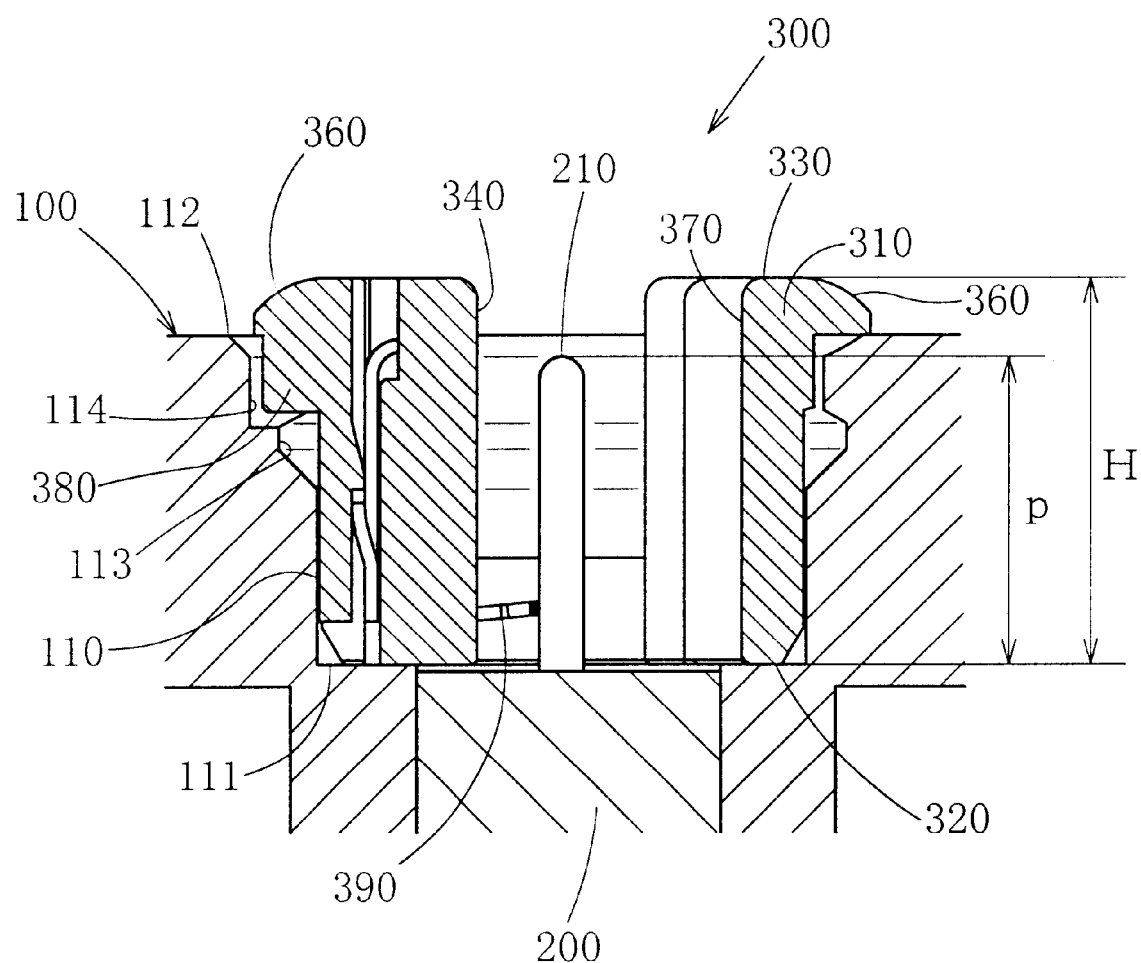
FIG. 3 is a longitudinal sectional view showing the shunt of the first embodiment, which is fitted into the socket.

As shown in FIG. 3, FIG. 7A and FIG. 7B, the height H of the annular wall 310 of the shunt 300 is set to be not less than the sum (d+p) of the depth d of insertion into the fitting hole 340 along the axial direction of the pins 210 when the female connector 400 is inserted obliquely and the height p of the pins 210: namely H≧(d+p). The height of the annular wall 310 of the shunt 300 exceeds the depth of the socket 110, and the annular wall 310 of the shunt 300 protrudes from the opening 112 of the socket 110. The annular wall 310 is provided to such a height that even if the female connector 400 is inserted obliquely, the female connector 400 will not press on the pins 210. In other words, when the female, connector 400 is inserted obliquely, the boss 420 will strike on the annular wall 310 of the shunt 300 and halt. Although the boss 4210 will partly come into the fitting hole 340, the part of the boss 420 coming into the fitting hole 340 will not strike on the pins 210, and even if it contacts the pins 210, it will not press on them. The top 330 of the annular wall 310 of the shunt 300 is formed to have a brim-like part that hangs over the outer face of the inflator housing 100. In other words, the top 330 is formed to have an inverted-L shaped section. The outer circumferential edge of the top 330 is chamfered to have a chamfered part 360. The present invention includes embodiments wherein the top of the annular wall is not formed to have a brim-like part and the section of the top is straight and embodiments wherein the outer circumferential edge of the top of the annular wall is chamfered. 380 denote two bosses, which are provided on the external side of the annular wall 310 of the shunt 300. 114 denotes cavities, which are concavely formed in the circumference of the opening 112 of the socket 110. When the bosses 380 fit into the cavities 114, the shunt 300 will be prevented from rotating.

The actions and effects of the above-mentioned embodiment will be described. As shown in FIG. 5A, FIG. 5B and FIG. 6A and FIG. 6B, when the shunt 300 of this embodiment is fitted into the socket 110, the pins 210 of the squib 200 will come into the fitting hole 340 of the shunt 300 from the bottom side. The short-circuit piece 390 will contact both the pins 210 to short-circuit them; thus the squib will not function. Next, when the female connector 400 is fitted into the fitting hole 340, the short-circuit piece 390 will be pushed by the female connector 400 to move away from the pins 210, and at the same time the female connector 400 will contact the pins 210 to make the actuation circuit of the squib 200 active; thus the inflator can be actuated. First, as shown in FIG. 5A and FIG. 6A, when the boss 420 of the female connector 400, with the slider 450 being raised to the top side of the connector body 410, is fitted into the fitting hole 340, the female terminals 430 of the, female connector 400 will contact the pins 210 and the pawls 441 of the locking pieces 440 will hook on the grooves 113 of the socket 113. Next, as shown in FIG. 5B and FIG. 6B, when the button 453 is pressed to slide the slider 450 towards the top end of the boss 420, the first wedges 451 will push the contact pieces 391 outwards. As a result, the contact pieces 391 will be moved away from the pins 210, and in turn, the actuation circuit of the squib 200 will become active. Moreover, as the second wedges 452 will push the locking pieces 440 of the female connector 400 outwards, the pawls 441 of the locking pieces 440 will securely hook on the grooves 113 of the socket 110.

Figure 8:
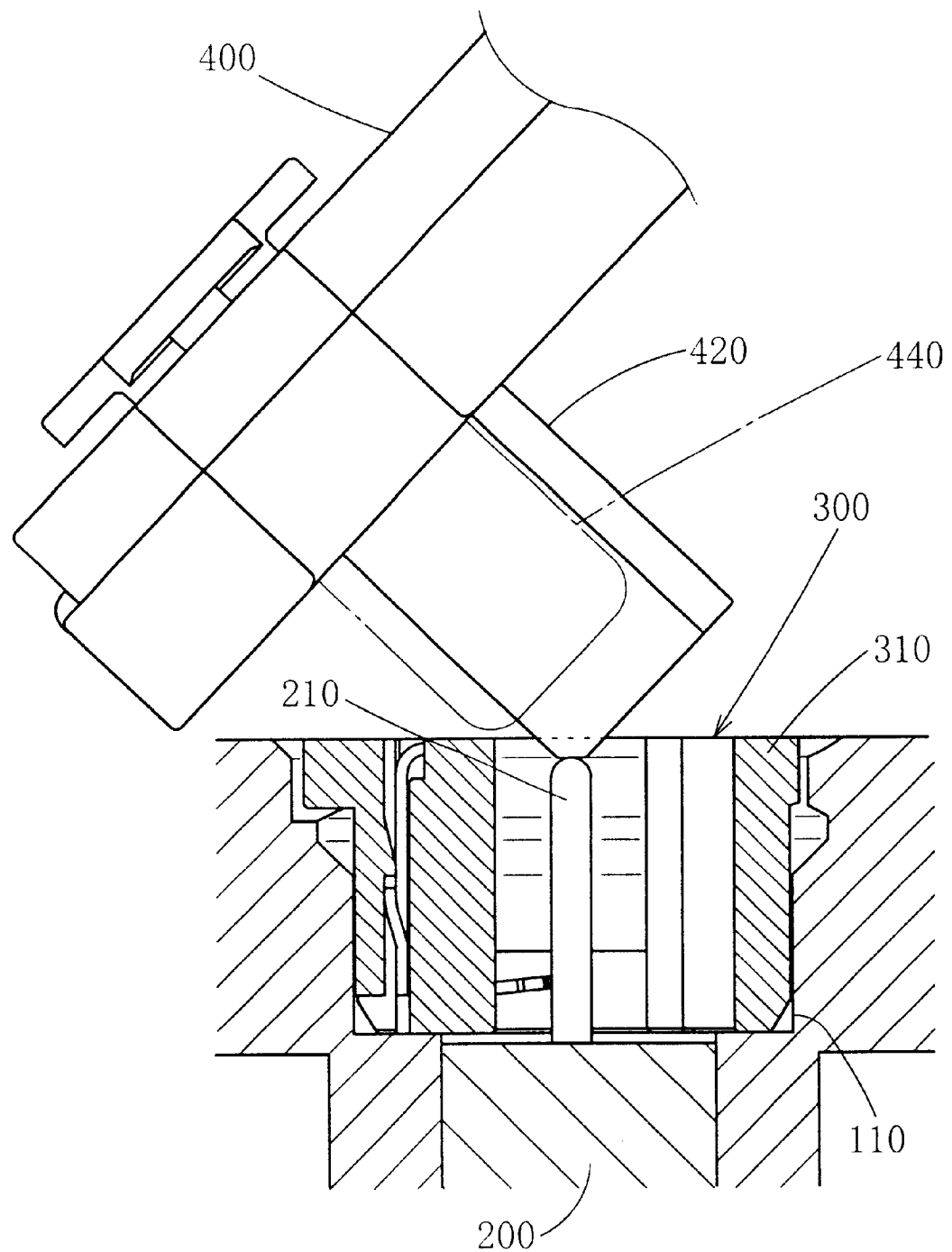
FIG. 8 is a longitudinal sectional view of a shunt of a comparative example, which is fitted in a socket. A locking piece is indicated by an imaginary line.
Figure 9:
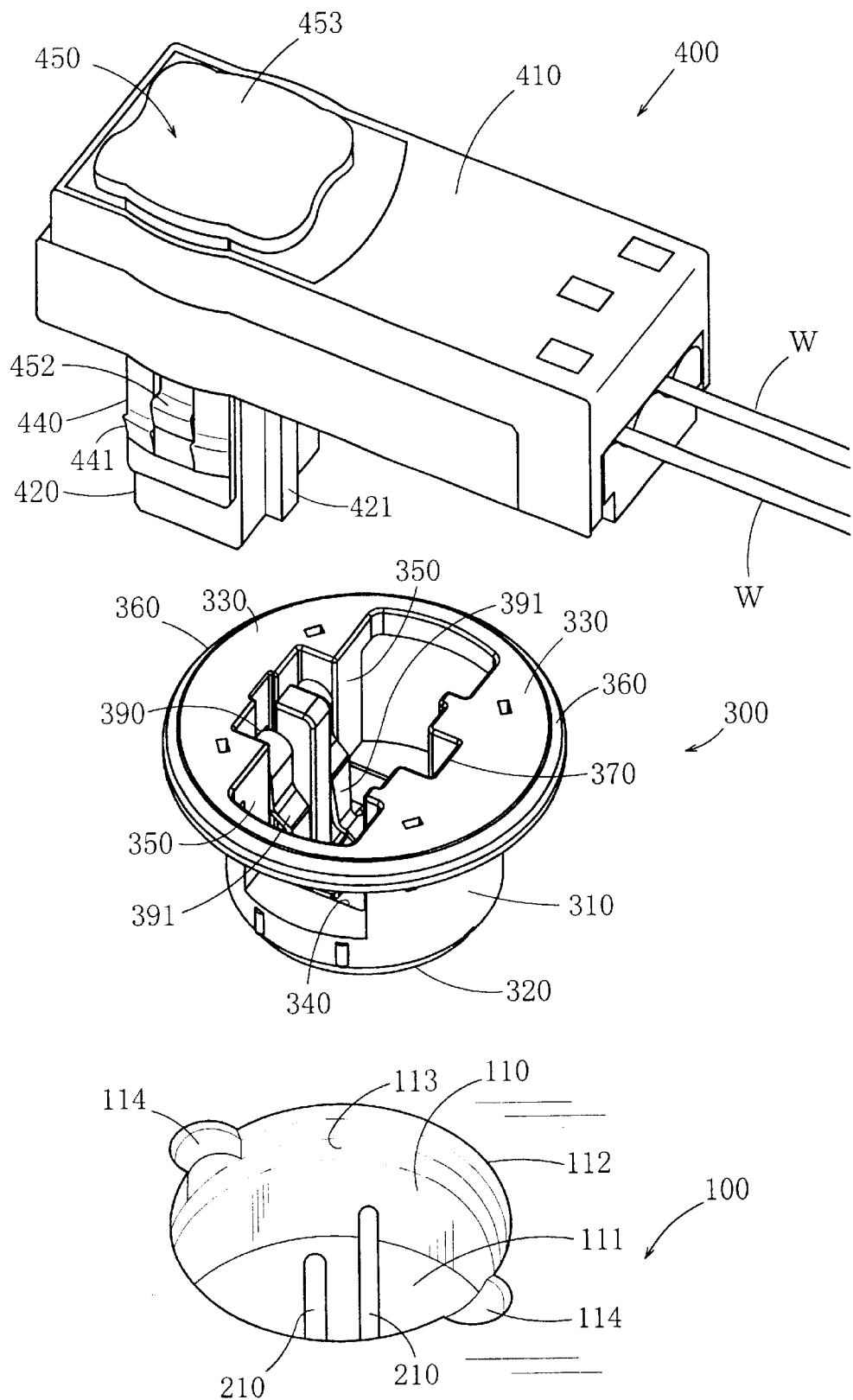
FIG. 9 is a perspective view separately showing an inflator housing, a shunt and a female connector according to the second embodiment of the present invention.
Figure 10A:
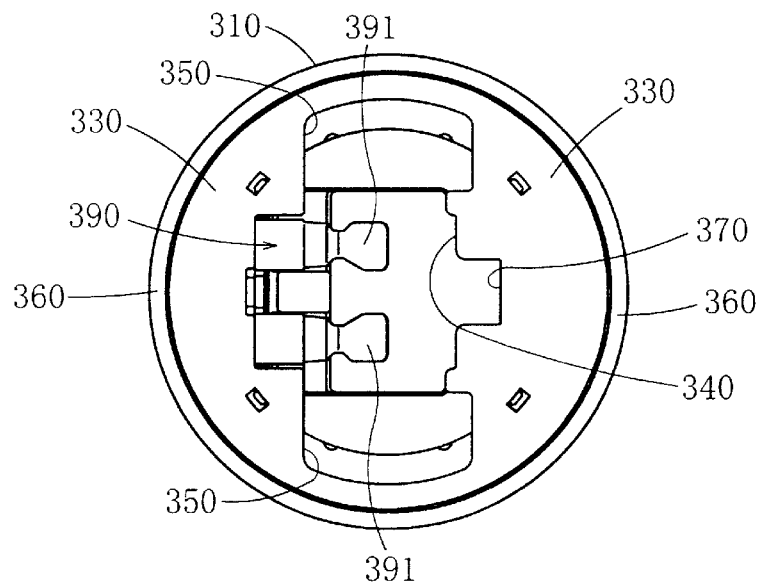
FIG. 10A, FIG. 10B and FIG. 10C show the shunt of the second embodiment.
Figure 10B:
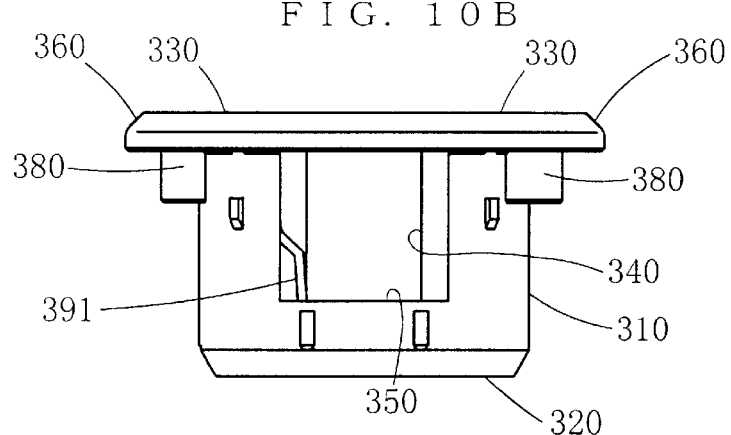
Figure 10C:
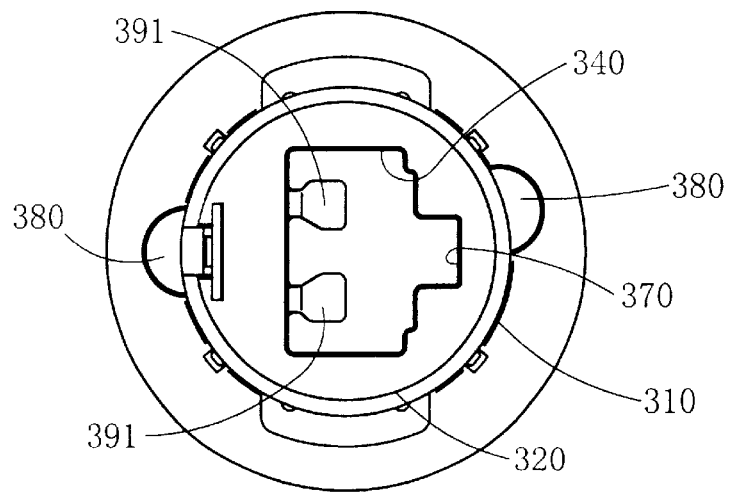

In this case, as shown in FIG. 7A and FIG. 7B, if the female connector 400 is inserted obliquely, the female connector 400 will strike on the annular wall 310 of the shunt 300 and halt. However, as the depth d of insertion of the female connector 400 into the fitting hole 340 along the axial direction of the pits is not more than the length (H−p) from the top end of the pins 210 to the top 330 of the annular wall 310, namely d≦(H−p), the female connector 400 will not press on the pins 210. Accordingly, the female connector 400 will not force the pins 210. Hence the pins 210 will not be deformed, and when the female connector 400 is reinserted properly, the female connector 400 will be reliably connected to the pins 210. As this eliminates the need of correcting deformed pins straight or replacing the entire inflator with a new one, elimination of such troubles reduces the cost. FIG. 8 shows a comparative example. In the comparative example, a member that exhibits the same function as a member of the above-mentioned embodiment Is marked with the same mark as the member of the above-mentioned embodiment. In the comparative example, the height of an annular wall 310 of a shunt 300 is approximately equal to the depth of a socket 110. And when a female connector 400 is inserted obliquely, the female connector 400 will press on pins 210 before the female connector 400 strikes on the annular wall 310 of the shunt 300 and halts. With this arrangement, the pins 210 may be forced. In contrast to this, in the case of FIG. 7A showing the above-mentioned embodiment, when the female connector 400 is inserted obliquely, a rib 421 being provided on the boss 420 of the female connector 400 will strike on an upper part of a vertical groove 370 of the shunt 300 and halt; when properly inserted, the vertical groove 370 will receive the rib 421. When the female connector 400 halts, as the height H of the annular wall 310 of the shunt 300 is not less than the sum (d+p) of the depth d of insertion of the female connector 400 into the fitting hole 340 along the axial direction of the pins when the female connector 400 is inserted obliquely and the height p of the pins 210, the female connector 400 will not press on the pins 210. In the case of FIG. 7B, when the female connector 400 is inserted obliquely, the boss 420 of the female connector 400 will strike on an upper part of the annular wall 310 of the shunt 300 and halt. When it halts, as the height H of the annular wall 310 of the shunt 300 is not less than the sum (d+p) of the depth d of insertion of the female connector 400 into the fitting hole 340 along the axial direction of the pins when the female connector 400 is inserted obliquely and the height p of the pins 210, the female connector 400 will not press on the pins 210 of the squib 200.

Similar actions may be obtained by making the inflator housing 100 thicker or reducing the height of the pins 210 from the bottom 111 of the socket 110. However, as the configurations of inflators and squibs tend to be unified into the recommended configurations, the above-mentioned alterations merely invite confusion by increasing the kinds of inflators and squibs. In contrast to this, when the shunt 300 of the above-mentioned embodiment is used, forcing of pins 210 by the female connector 400 can be prevented without modifying the configurations of the inflator and the squib. Thus this shunt 300 is useful. It may be necessary to increase the length of the boss of the female connector in comparison with the conventional ones. In such a case, the thickness of the connector body can be reduced to maintain the elevation from the surface of the housing 100 to the top of the female connector to a level comparable to those of the conventional ones and in turn secure the overall compactness.

The present invention includes embodiments of a shunt wherein a female connector having no locking pieces is fitted. The present invention also includes embodiments of a shunt wherein a female connector having no slider is fitted. At the time of filing of the present application for patent, the configuration of a housing wherein grooves for hooking are formed in the internal wall of the socket is the recommended configuration. Accordingly, the shunt 300 wherein notches 350 are formed in the annular wall 310 to connect the female connector having locking pieces 440 of the above-mentioned embodiment is a preferred embodiment. With this arrangement, when the female connector 400 is fitted into the fitting hole 340 of the shunt 300, the locking pieces 440 of the female connector 400 will be inserted into the notches 350 of the shunt 300 and at the same time locked in the grooves 113 in the inner wall of the socket 110.

The present invention includes embodiments wherein the top of the annular wall is not formed to have a brim and the section of the top is straight. However, as is the case of the above-mentioned embodiment, when the top 330 of the annular wall 310 is formed to have a brim so that the top 330 hangs over the external face of the inflator housing 100, the brim part will cover the gap between the annular wall 310 of the shunt 300 and the inner wall of the socket 110. As a result, the female connector 400 will not be caught by the gap and will be fitted into the shunt 300 smoothly. Accordingly, the efficiency of fitting the female connector 400 into the shunt 300 is improved.

The present invention includes embodiments wherein the outer acircumferential edge of the top of the annular wall is not chamfered. However, as is the case of the above-mentioned embodiment, when A the outer circumferential edge of the top 330 of the annual wall 310 is chamfered, the female connector 400 will be guided by this chamfered part 360 and smoothly fitted into the shunt 300 without being caught on the annular wall 310 of the shunt, 300. Accordingly, the efficiency of fitting the female connector 400 into the shunt 300 is improved further.

FIG. 9, FIG. 10A, FIG. 10B and FIG. 10C show a second embodiment. The description of the first embodiment is quoted intact as the description of the second embodiment, the same marks are given to the same members, and only parts differing in construction from the first embodiment will be described. In the shunt 300 of the first embodiment, the top 330 of the annular wall 310 is divided into two parts by the notches 350. In contrast to it, in the shunt 300 of the second embodiment, the external circumferential edge of the brimmed top 330 is continuously formed into a ring.

The second embodiment exhibits actions and effects similar to those of the first embodiment. In the second embodiment, as the gap between the annular wall 310 and the internal wall of the socket 110 is covered by the brim all over the circumference, the female connector will not be caught on the gap and it will be smoothly fitted into the shunt 300. Thus the efficiency of fitting the female connector 400 into the shunt 300 is improved further. Moreover, as the external circumferential edge of the top 330 is annular and continuous, the strength of the annular wall 310 is improved. Furthermore, the annular continuous external circumferential edge of the top 330 prevents any objects from coming into the fitting hole 340, and the function of protecting the short-circuit piece 390 is improved more. This is particularly effective when the shunt 300 is kept in an isolated state such as during transportation of the shunt 300.

The constructions of the female connectors 400 of the above-mentioned embodiments are merely illustrations. The construction of the female connector can be varied. One illustration is a female connector 400, wherein locking pieces 440 are separated from the connector body 410 and integrated with the second wedges 452. In this case, when the button 453 is pressed, the locking pieces 440, first wedges 451 and second wedges 452 will slide simultaneously.

With the description of these embodiments the first shunt of squib that was described in the summary of the invention has been fully disclosed. Moreover, with the description of these embodiments, the second through fifth shunts of squibs, which will be described below, have been fully explained.

The second shunt of squib is a shunt of squib according to the first shunt of squib, wherein a notch, into which a locking piece of the female connector to be hooked on the groove in the inner wall of the socket is inserted, is formed in the annular wall. With this arrangement, when the female connector is fitted into the fitting hole, the locking piece of the female connector will be inserted into the notch and at the same time hooked on the groove in the inner wall of the socket. Thus a shunt that corresponds to a female connector having a locking piece can be provided.

The third shunt of squib is a shunt of squib according to the first shunt of squib or the second shunt of squib wherein, the top of the annular wall is formed to have a brim to hang over the external face of the inflator housing. With this arrangement, as the gap between the annular wall and the internal wall of the socket is covered by the brim part, the female connector will not be caught on the gap and will be fitted into the shunt smoothly. Hence the efficiency of fitting the female connector into the shunt is improved.

The fourth shunt of squib is a shunt of squib according to the third shunt of squib wherein, the external circumferential edge of the brimmed top is annular and continuously formed. With this arrangement, as the gap between the annular wall and the internal wall of the socket is covered all over the circumference by the brim part, the female connector will not be caught on the gap and will be fitted into the shunt smoothly. Hence the efficiency of fitting the female connector into the shunt is improved further. Moreover, as the external circumferential edge of the top is annular and continuous, the strength of the annular wall is improved further. Furthermore, any objects are prevented from getting into the fitting hole by the annular and continuous external circumferential edge of the top, and the function of protecting the short-circuit piece is improved further. This is particularly effective when the shunt is kept in an isolated state such as during transportation of the shunt.

The fifth shunt of squib is a shunt of squib according to any one of the first shunt of squib through the fourth shunt of squib wherein, the external circumferential edge of the top of the annular wall is chamfered. With this arrangement, as the female connector will not be caught on the external circumferential edge of the top, the female connector will be fitted into the shunt smoothly. Hence the efficiency of fitting the female connector into the shunt is improved further.

What is claimed is:

1. A shunt, which fits into a cylindrical socket being concavely formed in an external face of a housing of an inflator and short-circuits a pair of pins of a squib, said pair of pins rising at the center of the socket from the bottom to a point near to the opening, said shunt comprises an annular wall having a fitting hole into which pins enter from the bottom side at the center thereof and into which the female connector fits from the top side, and a short-circuit piece, which is provided on said annular wall, will contact both of the pins when the shunt is fitted into the socket, and will be pushed to move away from the pins when the female connector is fitted into the fitting hole, the height of said annular wall being not less than the sum of the depth of insertion of the female connector into the fitting hole in the axial direction of the pins when the female connector is inserted obliquely into the fitting hole, plus the height of the pins from the bottom of the socket, and the top of the annular wall is formed to include a brim to hang over the external face of the inflator housing.

2. A shunt as recited in claim 1, wherein a notch, into which a locking piece of the female connector to be hooked on the groove in the inner wall of the socket is inserted, is formed in the annular wall.

3. A shunt as recited in claim 1, wherein the external circumferential edge of the top including the brim of the annular wall is annular and continuously formed.

4. A shunt as recited in claim 2, wherein the external circumferential edge of the top including the brim of the annular wall is annular and continuously formed.

5. A shunt as recited in claim 1, wherein the external circumferential edge of the top of the annular wall is chamfered.

6. A shunt as recited in claim 2, wherein the external circumferential edge of the top of the annular wall is chamfered.

7. A shunt as recited in claim 3, wherein the external circumferential edge of the top of the annular wall is chamfered.

8. A shunt as recited in claim 4, wherein the external circumferential edge of the top of the annular wall is chamfered.

9. An electrical connection arrangement comprising:

a component having a socket recessed into an outer surface thereof and having two electrical contact pins located in said socket and protruding in a pin axis direction from a socket floor of said socket toward a plane of said outer surface of said component, wherein said plane is orthogonal to said pin axis direction;

a shunt comprising a shunt body that includes an annular wall which bounds a fitting hole therein, and that is dimensioned and shaped to be fitted into said socket with said pins protruding into said fitting hole, and further comprising an electrically conductive short-circuit piece which contacts and short-circuits said pins when said shunt body is fitted into said socket; and an electrical connector plug comprising a plug boss dimensioned and shaped to be plugged in said pin axis direction into said fitting hole of said shunt body which is fitted into said socket, with said pins being received in at least one pin contact opening of said plug boss, and further comprising two electrical contact elements positioned respectively to make electrical contact with said pins when said plug boss is plugged into said fitting hole, and further including a configuration that is shaped and positioned to deflect said short-circuit piece out of electrical contact with at least one of said pins when said plug boss is plugged into said fitting hole;

wherein said annular wall of said shunt body includes a protruding wall portion that protrudes outwardly from said socket in said pin axis direction beyond said plane of said outer surface of said component by a protrusion height when said shunt body is fitted into said socket; and wherein said protrusion height, said fitting hole, said plug boss, and said pins are respectively dimensioned and configured so that said plug boss cannot physically contact said pins if said plug boss is partially inserted into said fitting hole at an oblique angle relative to said pin axis direction.

10. The electrical connection arrangement according to claim 9, wherein said component is a pyrotechnic gas generating inflator for inflating an airbag.

11. The electrical connection arrangement according to claim 9, wherein said protruding wall portion of said annular wall comprises a brim that projects radially outwardly from said recess to overhang onto said outer surface of said component.

12. The electrical connection arrangement according to claim 11, wherein a circumferential outer edge of said brim is chamfered.

13. The electrical connection arrangement according to claim 9, wherein a circumferential outer edge of said protruding wall portion is chamfered.

14. An electrical connection arrangement comprising:

a component having a socket recessed therein and having two electrical contact pins in said socket respectively parallel to an axis of said socket;

a shunt comprising a shunt body adapted to be fitted into said socket and having a fitting hole therein, and an electrically conductive short-circuit piece which electrically contacts and short-circuits said pins when said shunt body is fitted into said recess; and an electrical connector plug comprising a plug boss adapted to be plugged into said fitting hole in a plug-in direction parallel to said pins and said axis of said socket, two electrical contact elements that respectively make electrical contact with said pins when said plug boss is plugged into said fitting hole, and means for breaking the electrical contact and the short-circuiting of the pins with the short-circuit piece;

wherein said shunt further comprises means for preventing said plug boss from physically contacting said pins if said plug boss is partially inserted into said fitting hole at an oblique angle relative to said plug-in direction.

\* \* \* \* \*

UNITED STATES PATENT AND TRADEMARK OFFICE
CERTIFICATE OF CORRECTION

PATENT NO.     : 6,544,060 B2
DATED          : April 8, 2003
INVENTOR(S)    : Wakui et al.

It is certified that error appears in the above-identified patent and that said Letters Patent is hereby corrected as shown below:

Column 1,
Line 65, after "of", replace "t he" by -- the --;

Column 2,
Line 20, after "reliably", insert -- . --;
Line 63, after "the", delete -- : --;

Column 3,
Line 36, after "preferable", replace "[ e]xamples" by -- examples --;

Column 4,
Line 2, before "corresponding", replace "al" by -- a --;
Line 3, before "by", replace "210i" by -- 210 --;
Line 6, after "391", replace "with" by -- will --;
Line 32, after "through", delete "a";
Line 36, after "the", delete ":";
Line 46, after "210", delete ":";
Line 53, after "female", delete ",";
Line 55, after "boss", replace "4210" by -- 420 --;

Column 5,
Line 41, after "of the", replace "pits" by -- pins --;

Column 6,
Line 65, after "outer", replace "acircumferential" by -- circumferential --;
Line 67, after "when", delete -- A --;

UNITED STATES PATENT AND TRADEMARK OFFICE
CERTIFICATE OF CORRECTION

PATENT NO. : 6,544,060 B2
DATED : April 8, 2003
INVENTOR(S) : Wakui et al.

It is certified that error appears in the above-identified patent and that said Letters Patent is hereby corrected as shown below:

Column 7,
Line 42, after "embodiments", insert -- , --.

Signed and Sealed this

First Day of July, 2003

JAMES E. ROGAN
*Director of the United States Patent and Trademark Office*